(No Model.)

S. G. HOEKSTRA.
HORSE POWER.

No. 334,074. Patented Jan. 12, 1886.

Witnesses
Inventor
Sjoerd G. Hoekstra,
By his Attorney Chas. H. Fowler

UNITED STATES PATENT OFFICE.

SJOERD GERBENS HOEKSTRA, OF SHEBOYGAN, WISCONSIN.

HORSE-POWER.

SPECIFICATION forming part of Letters Patent No. 334,074, dated January 12, 1886.

Application filed June 26, 1885. Serial No. 169,832. (No model.)

*To all whom it may concern:*

Be it known that I, SJOERD G. HOEKSTRA, a citizen of the United States, residing at Sheboygan, in the county of Sheboygan and State of Wisconsin, have invented certain new and useful Improvements in Horse-Powers; and I do hereby declare the following to be a full, clear, and exact description of the same, reference being had to the annexed drawings, making a part of this specification, and to the letters and figures of reference marked thereon.

Figure 1:
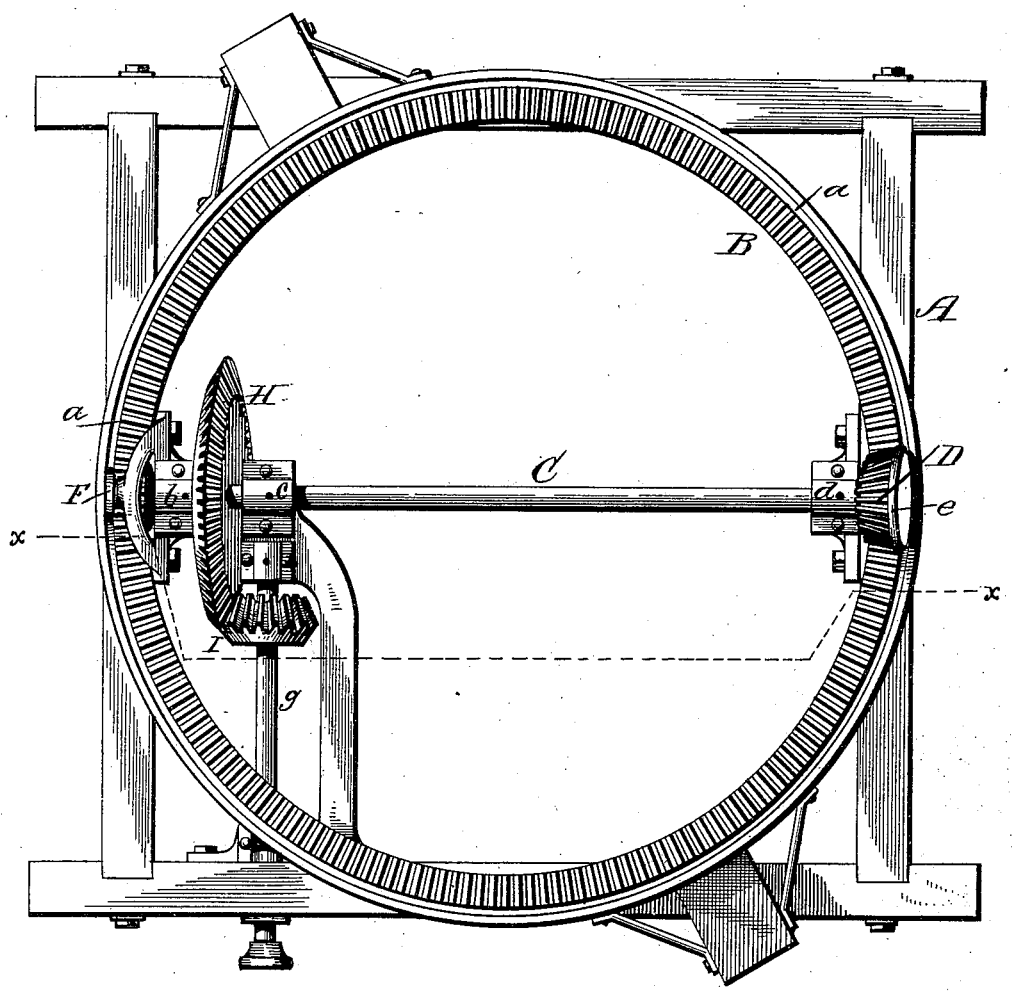
Figure 2:
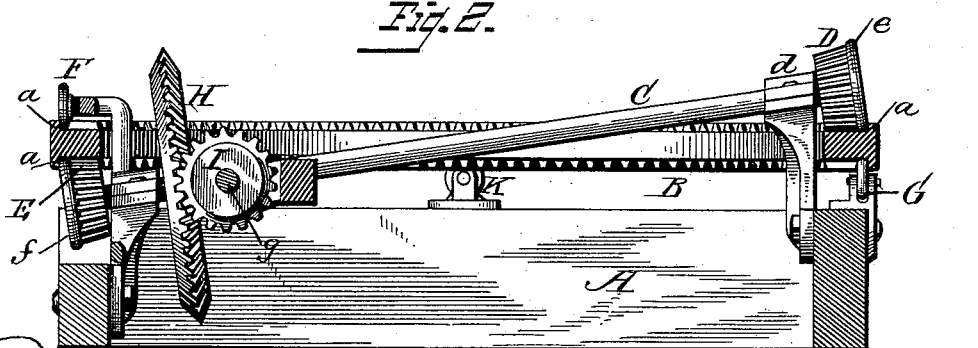

Figure 1 of the drawings is a top plan view of my invention, and Fig. 2 a sectional elevation taken on the line $x\,x$ of Fig. 1.

The object of the present invention is to provide a simple and effective horse-power, in which the power of horses can be successfully employed to drive other machinery; and it consists in the details of construction, substantially as shown in the drawings, and hereinafter described and claimed.

In the accompanying drawings, A represents a suitable frame or support for the master-wheel B, the latter having any well-known means for connecting thereto the team of horses. The master-wheel B has cogs upon both its upper and lower sides, and also near the outer rim thereof grooves $a$. The main shaft C, which extends diametrically across the wheel B, has its bearings in suitable boxes, $b\ c\ d$, and at one end is provided with a pinion, D, which meshes with the cogs or teeth upon the upper side of the wheel B. The pinion D engages with the teeth on the wheel B, and has upon its outer or larger end a circumferential flange, $e$, to fit in the groove $a$ of the wheel B, thus guiding the wheel in its movement and securely holding the pinion engaged therewith. Upon the opposite end of the shaft C is a similar pinion, E, which is also provided with a flange, $f$, said pinion engaging with the teeth or cogs upon the under side of the wheel B, and the flange $f$ seated in the groove $a$.

The frame or support A, upon the opposite sides thereof, is provided with guide-rollers F G, engaging, respectively, with the grooves $a$ upon the upper and lower side of the wheel B. These rollers, as well as the flanges on the pinions, hold the master-wheel centrally and render it more perfect in its operation. The main shaft C is arranged obliquely or on an incline, to bring the pinions D E in position to engage, respectively, with the upper and lower sides of the wheel B. To increase the motion, I provide the shaft C with a bevel gear-wheel, H, which meshes with the teeth of a pinion, I, on a shaft, $g$, arranged at right angles to said main shaft. To further hold the master-wheel B in position, any number of rollers, K, may be employed, all mounted and arranged to work together on a substantial frame.

Having now fully described my invention, what I claim as new, and desire to secure by Letters Patent, is—

1. In a horse-power, a master-wheel provided with teeth and grooves upon both its sides, in combination with a main shaft having at its ends pinions to engage with the wheel on its upper and lower sides, and flanges on the pinions to engage with the grooves, substantially as and for the purpose set forth.

2. In a horse-power, a master-wheel having teeth and grooves, and guide-rollers working in the grooves, in combination with an obliquely-arranged main shaft having at its ends flanged pinions, a shaft arranged at right angles to the main shaft and provided with a pinion engaging with a gear-wheel thereon, substantially as and for the purpose set forth.

In testimony that I claim the above I have hereunto subscribed my name in the presence of two witnesses.

SJOERD GERBENS HOEKSTRA.

Witnesses:
  W. JENNER,
  F. MEISEKOLHEN.